Aug. 29, 1967　　　　L. SILVERMAN　　　　3,338,665
FOAM ENCAPSULATION METHOD OF NUCLEAR REACTOR SAFETY
Filed March 28, 1963
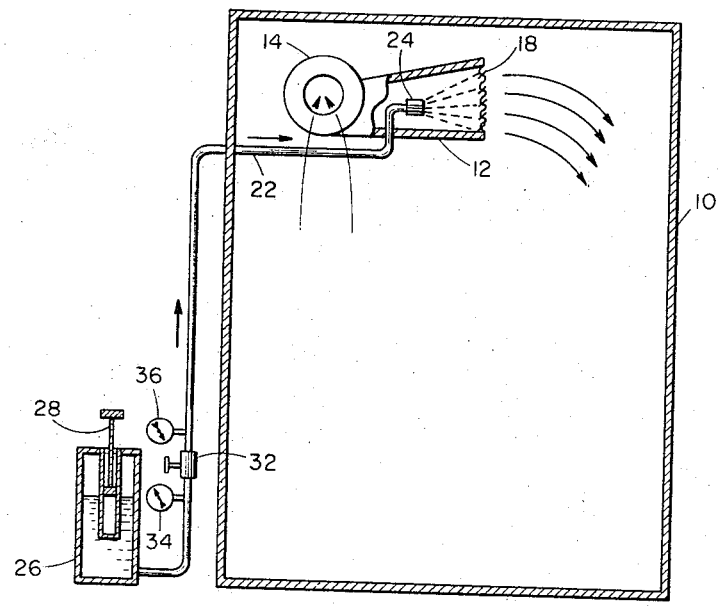
INVENTOR.
LESLIE SILVERMAN

United States Patent Office 3,338,665
Patented Aug. 29, 1967

3,338,665
FOAM ENCAPSULATION METHOD OF
NUCLEAR REACTOR SAFETY
Leslie Silverman, Dover, Mass., assignor to the United States of America as represented by the United States Atomic Energy Commission
Filed Mar. 28, 1963, Ser. No. 268,840
5 Claims. (Cl. 23—2)

ABSTRACT OF THE DISCLOSURE

Foam encapsulation for the entrapment of radioactive particulate and certain gaseous products. A highly expanded aqueous foam up to 1,000 to 1 volume ratio is generated from a liquid foam solution containing an ingredient capable of reacting with the gas to be removed and forming a solid residue. The foam is generated in a region where the undesirable solid and gaseous products are present.

---

The invention described herein was made in the course of, or under contract with the U.S. Atomic Energy Commission.

The present invention relates to a foam encapsulation method of reactor safety and more particularly to a method for using reactants with high expansion foaming materials for absorbing fission gases and encapsulating particulates released from a nuclear fission reactor.

One of the problems involved in the development and construction of nuclear fission reactors is that of safety for the surrounding population. Economies can be realized, it is understood, by placing reactor power plants near their points of use and this usually means at locations of large populations. This is not feasible, however, unless adequate safeguards are taken to protect the population not only from radioactive products discharged during normal operation of the reactor but also to eliminate any potential hazard to the public from nuclear excursions or accidents involving subsequent release of fission products.

It is well known that the release of large amounts of radioiodine and other radioactive gases to the atmosphere in populated areas could give rise to a number of acute public health and safety problems. In the Windscale, England, accident of several years ago, for example, there was an estimated 20,000 Curie radioiodine release to the environs. As a result, for many years now there have been research and development programs conducted in this country and others investigating this problem. Specifically, these investigations have been concerned with controlling the release of radioactive halogens, noble gases, other fission gases and particulate resulting from the condensation of metal vapors and oxides and those developing from such gases by radioactive decay that might be released from routine operations of, or possible accidents in, nuclear reactor power plants.

In the past, the released radioactive products described above have been contained or controlled by the use of simple water or alkali scrubbers and atmospheric dilution. But these techniques are only useful for relatively small amounts of the products and are not deemed to be adequate for higher emissions due to more powerful reactors or releases from possible accidents.

More efficient and effective filters and filtering systems have been developed but the expense of such equipment, especially when to be available on a standby basis to meet sizable releases in any possible accident, is very great with the result that overall efficiencies of a power plant with such protective devices tend to decline appreciably. Also, in applications where space requirements are stringent, as aboard sea-going vessels, necessary equipment for this type of emergency protection becomes a prohibitive limitation on the usefulness of the reactor power source.

A completely new line of approach to this problem has been suggested however, which holds out great promise of providing the degree and type of protection desired at sharply reduced capital costs and space requirements. It has been proposed that highly expansive foams be generated in time of emergency to encapsulate halogens and particulates within the containment housing the nuclear reactor. This entrapment would reduce design value leakage and could prevent, it is thought, leakage of the radioactive products from the containment should the latter be breached. In this proposal, aqueous or in certain cases, plastic and/or rigid high expansion foams (up to 1000 to 1 and higher volume ratios) of any desired nature (anionic, cationic, or non-ionic) would be employed. The plastic or rigid foams presumably would be useful as a means of producing capture and storage of the fission products for indefinite periods of time if necessary.

It is perfectly apparent, however, that while high expansion foams could fill a reactor containment very rapidly and be very useful under the circumstances described, the mere physical entrapment of radioiodine is not likely to be very efficiently accomplished as long as it remains gaseous and then there remains the great danger of re-release of the iodine should the foam structure be altered. In the case of rigid foams, this would be breakdown due to extremes in temperature, radioactivity or other local environmental conditions, or even attempts at its removal. In the case of the non-rigid foams, the re-release would occur as the foam subsides.

In order to enhance the ability of the foam to carry out its function as described above, both from the point of view of initial effectiveness and also to obtain a permanent entrapment accompanied by ease of removal, I have invented a method involving the treatment of aqueous foams with certain halogen reactants to increase the ability of the non-rigid foams to trap the radioactive products and to keep them from spreading. In accordance with this invention, material is added to the foam to react with the radioactive halogens and other gases to reduce them to a particulate, and to absorb the resulting particles as well as all of the other dangerous particulates in the foam structure so that as the foam subsides, the particulate materials will collect in the foam material as a sludge or residue which is easily and safely removed thereafter.

It is hence a principal object of this invention to provide a method for capturing and reacting with radioactive products discharged from a nuclear reactor.

Another object of this invention is to provide a method for using reactants with high expansion foams to absorb fission gases and to encapsulate particulates resulting from the condensation of metal vapors and oxides and those developed from the fission gases by radioactive decay.

Still another object is a standby safety method for a nuclear reactor which is capable of absorbing released fission products and forming a product easily removed without causing permanent damage to the reactor.

Other advantages and objects of this invention will hereinafter become more apparent from the following description of preferred embodiments of this invention, and the accompanying drawings in which is illustrated a preferred embodiment for carrying out this invention.

In accordance with this invention a high expansion (exceeding 300 to 1 volume ratio gas to liquid) foam is generated either by spraying a prepared liquid solution against a wetted porous absorbent screen or by other foam generating apparatus. Suitable apparatus for this purpose is shown schematically in the figure and a more detailed description appears in the U.S. Atomic Energy Commission publication TID–7627 (illustrated on page 399). Referring to the drawing, shown is a sealed or fully enclosed tank or cabinet 10 for containing a gaseous atmosphere contaminated with gases and particulate including radioactive products to be encapsulated in accordance with this invention. Tank 10 may be a containment for a nuclear reactor (not shown). In the event the reactor suffers a failure and releases radioactive products, it will be necessary to insure that these products do not escape from the containment should it develop a leak, and in addition, to place these products in such form that they can conveniently be removed.

Within tank 10 is shown a foam generator 12 of the type mentioned above. This device consists of a fan 14, a discharge nozzle 16 and a screen 18 across the exit of nozzle 16. Fan 14 sucks in gas and the suspended particles from within tank 10 and forms the foam with foaming solution entering by way of a pipe 22. This foaming solution is discharged into nozzle 16 by way of a spray nozzle 24. The solution is prepared or stored in a tank 26 outside of tank 10 and can be fed by gravity by proportioning pumps or by being pressurized by any means such as an air pump 28 illustrated through pipe 22 into foam generator 12. A valve 32 and pressure gages 34 and 36 complete the structure illustrated.

A suitable foaming solution for use in accordance with this invention can be prepared from any of the well known foaming agents and water. In this context, by foaming agent is meant any satisfactory surfactant or wetting agent, many of which are well known and readily available. Some well known foaming agents are commercially sold detergents such as magnesium or ammonium ether lauryl sulfate, or castile soap, glycerine, or sodium succinate all of which have been used successfully to produce foams suitable for carrying out this invention.

For reacting with the radioactive halogens, such as bromine and iodine, released in a reactor accident and to transform them into a non-volatile state, one or more basic halogen reactants such as sodium or potassium thiosulfate, silver nitrate, potassium iodide, protein in the form of casein, and copper sulfate solutions are added to the foam.

To extend the life of the foam or to increase its resistance to pressure and temperature charges, foam stabilizers such as lauryl alcohol stabilizer, gelatin or thickening agents such as carboxy-methyl-cellulose may be added to the foaming solution.

While in accordance with this invention the reactant and stabilizer are added to the solution prior to foaming, under some circumstances it may be feasible or desirable to inject these ingredients directly into the generating foam.

The mechanism by which this invention acts to trap the radioactive discharge products is fairly well understood. The foam acts as an encapsulant to trap the gas and the particulate within the bubbles during foam formation. Once entrapped within the bubbles which actually represent small settling chambers, the particles subsequently settle or diffuse to the walls where they remain. The fission gases within each bubble react with the reactant or reactants dissolved in the walls of the bubbles and produce particulate which also settle on the walls. All of the particulates then subside along with the foam if the latter is a non-rigid aqueous foam as produced by the materials described above. A sludge or thick residue is then formed which can be conveniently and safely removed.

The purpose of the foams produced in accordance with this invention is to provide tremendous surface areas for the reactions to take place. Assuming a foam bubble size of 1 cm. and a 40 cubic meter chamber, for example, there will be approximately 80 million bubbles produced. At an expansion ratio of 1000 to 1, the volume of liquid necessary is only 40 liters, and the volume per bubble is $5 \times 10^{-4}$ ml. The average thickness for a 1 cm. diameter bubble is about 2 microns. The surface areas involved for 1 cm. bubbles are 3 square cm. per bubble for a total of 24,000 square meters for the 40 cubic meter chamber mentioned. With such a tremendous area involved, absorption is very rapid.

High expansion ratios are important in the utilization of this invention for several reasons. First and foremost, when a reactor accident occurs it is important to fill the containment with foam as rapidly as possible. The higher expansion ratios permit this filling to take place very rapidly. In addition, the matter of logistics is presented. Less liquid solution is actually required to fill the cavity with foam when high expansion foams are used. To carry out this invention most effectively, an expansion ratio of at least 300 to 1 by volume is considered necessary.

With regard to the amounts of the various ingredients, to be used, an amount sufficient for the particular foaming agent to produce a suitable foam is necessary, varying of course for each agent. Proper bubble size has been found to be very important in the effectiveness of these foams for the purposes described and bubble sizes ranging from 1 cm. to 2½ cm. are found to be optimum. As bubble size increases, particles must travel further to the walls so that the settling rate slows. Similarly, the iodine molecules diffuse more slowly into the walls. In addition, as the bubbles increase in size the reaction or surface area decreases, so that average bubble diameter of 2½ cm. is considered the maximum size permissible. The minimum bubble size of 1 cm. is dictated by several other factors. Below this size there is a tendency for bubble breakdown and excessively thick bubble walls which causes a draining off of solution which is not available for use in the foams and hence is wasted. The range of 1 to 2½ cm. is one which optimizes all of the foregoing factors and brings about the best results. It has been found that at expansion ratios exceeding 300 to 1, this range of bubble size is obtained when sufficient foaming agent is used to reduce the surface tension of the water by at least 25%.

With regard to the amounts of reactant or reactants to be used, at least a stoichiometric solution should be used, based upon the expected amount of radioactive halogen gases to be released within the containment to be filled with the foam. The use of reactants in excess of those necessary for neutralization of the halogens provides a way of assuring a considerable margin for safety purposes. With regard to stabilizing agents, the amounts to be used are not critical except that it should be sufficient to obtain the desired degree of foam life.

Following are examples of this invention:

*Example 1*

A solution of 2½% by weight of ammonium lauryl ether sulfate in water at ambient temperature was prepared. Into a 1200 cu. ft. chamber of air at atmospheric pressure and temperature elemental iodine $I^{127}$ in concentration of 13.6 p.p.m. by volume was added. Utilizing the described foam generator located within the chamber the previously prepared solution was supplied to the generator where it was foamed at about 900 to 1 volume ratio of gas to solution filling the chamber with foam. In eight minutes after foaming was complete, sampling indicated that 42% of the original iodine remained in the chamber in gaseous state.

*Example 2*

The same experiment was run as in Example 1 except that ½% by weight of the iodine reactant sodium thiosulfate was added to the original foaming solution. Sampling the gas content of the chamber eight minutes after the chamber was filled with the foam only 28% of the original iodine was found to be present.

Example 3

The same test as Example 2 was repeated except that after the chamber was filled with foam the blower in the foam generator was used to recycle the gas and foam within the chamber. The gas content was sampled eight minutes after the original filling of the chamber and the iodine content was found to be 13% of the initial iodine content.

The results of Examples 1, 2 and 3 are embodied in Table I which follows:

TABLE I

| Time, minutes | Foam only (percent of original $I_2$ concentration) | Foam plus Sodium thiosulfate Blower off (percent of original $I_2$ conc.) | Foam plus Sodium thiosulfate Blower on (percent of original $I_2$ conc.) |
|---|---|---|---|
| 0 | 100 | 100 | 100 |
| 4 | 50 | 40 | 20 |
| 8 | 42 | 28 | 13 |
| 18 | 30 | 13 | 7 |
| 28 | 23 | 8 | 4 |
| 38 | 19 | 5.5 | 2.5 |
| 48 | 16 | 4 | 2.2 |
| 58 | 13 | 2.5 | 2 |
| 68 | 12.5 | 2.0 | 1.8 |
| 148 | 12.0 | 1.5 | 1.5 |

The most significant portion of the data listed in Table I is the decreasing iodine content in the first 10 to 20 minutes after foam application. It will be seen that with the addition of a halogen reactant there is a several fold decrease in iodine remaining in molecular form in the chamber and it is this period of time following a reactor accident in which the danger of containment leak is the greatest.

Examples 4 and 5

Experiments similar to Examples 2 and 3 were conducted with the addition of iodine reactants silver nitrate ½% by weight and potassium iodide ½% by weight to the foaming solution, respectively, instead of the sodium thiosulfate. The resulting foams were only slightly less effective than the sodium thiosulfate but far more effective than the use of foam without halogen reactants.

Example 6

A chamber of about 6000 cubic feet containing air at atmospheric pressure and temperatures was prepared with gaseous iodine and a foam generator as in the prior examples. Dry steam at sixty pounds pressure above atmospheric was injected into the chamber until the pressure within rose to about 12 inches water above atmospheric. Then foam was generated as in Example 2 with almost identical results indicating that the presence of steam in the tank at higher than atmospheric pressure will not detract from the usefulness of this invention.

From the foregoing description and examples of this invention it is apparent that a method has been provided capable of economically absorbing large amounts of radioactive products discharged from a nuclear fission reactor. One of the major features of using the high expansion foam as described is that it can be actuated automatically or even when it is still uncertain as to the nature of the nuclear excursion without producing any significant damage beyond limited wetting of the inside of the containment vessel.

While only aqueous foams have been described it is quite apparent that plastic and mineral foams may be found to be useful to carry out this invention. In addition, while liquid reactants capable of reacting with the fission gases have been described, it is quite apparent that reactants gaseous in nature may be mixed with the gas capable of reacting with the fission gases or even the particulate may be utilized where special problems exist. For example, hydrogen sulfide may be used rather than air, or along with the air, and of course other inert gases could be used in the foam generation.

It is therefore to be understood that my invention is to be limited only by the scope of the appended claims.

I claim:

1. A method of encapsulating gaseous iodine and particulates suspended in a gaseous environment comprising the steps of:
    (a) preparing a foaming solution from a liquid, a foaming agent, and an ingredient capable of reacting with said gaseous iodine to form a solid reaction product, said ingredient selected from the group consisting of sodium thiosulfate, silver nitrate, and potassium iodide, and
    (b) foaming said solution in said gaseous environment at an expansion ratio of at least 300 to 1 volume gas to liquid ratio to produce a foam consisting of bubbles in which the reaction between the iodine and said ingredient takes place to form solid particles, said particles and particulates diffusing into the walls of said bubbles to become trapped for convenient removal and disposal along with said foam.

2. The method of claim 1 in which the liquid is water and the foaming agent is a surfactant capable of reducing the surface tension of said water by at least 25%.

3. The method of claim 2 in which any known stabilizer is added to said foaming solution to extend the life of said foam.

4. A method of removing gaseous iodine and suspended solid particulates from a gaseous atmosphere comprising the steps of:
    (a) foaming a liquid solution with said atmosphere at an expansion ratio of at least 300 to 1 volume gas to liquid ratio, said solution comprising a liquid containing a surfactant and at least one ingredient capable of reacting with said iodine to form a solid reaction product, said ingredient being selected from the group consisting of sodium thiosulfate, silver nitrate, and potassium iodide;
    (b) permitting the resulting foam to subside to a liquid and solid residue with the solid product and particulates entrapped therein; and
    (c) removing said residue thereby effectively cleansing said atmosphere of said iodine and particulates.

5. The method of claim 4 in which said surfactant is selected from the group consisting of magnesium ether lauryl sulfate, ammonium ether lauryl sulfate, castile soap, glycerine, and sodium succinate.

References Cited

UNITED STATES PATENTS

| 793,707 | 7/1905 | Wultze | 23—2 X |
| 1,415,351 | 5/1922 | Howard et al. | 252—8.05 X |
| 1,817,778 | 8/1931 | Sperr | 23—2 X |
| 2,795,482 | 6/1957 | McNabney | 23—2 X |

OTHER REFERENCES

Dennis et al.: "Iodine Collection Studies—A Review," 7th AEC Air Cleaning Conference, TID 7627, March 1962, pp. 327–348, 332 relied upon.

Silverman et al.: "Diffusion Board Containment Concepts and Foam Encapsulation Studies—A Progress Report," 7th AEC Air Cleaning Conference, TID 7627, March 1962, pp. 390–405, 398–405 relied upon.

EARL C. THOMAS, *Primary Examiner.*

OSCAR R. VERTIZ, *Assistant Examiner.*